United States Patent Office 3,563,119
Patented Feb. 16, 1971

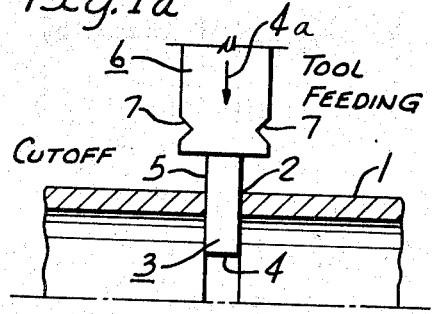
Fig. 1a Cutoff — Tool Feeding
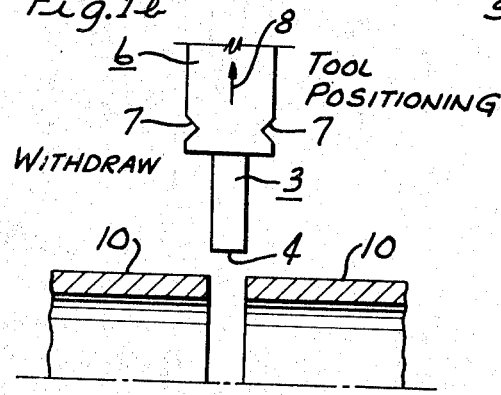
Fig. 1b Withdraw — Tool Positioning
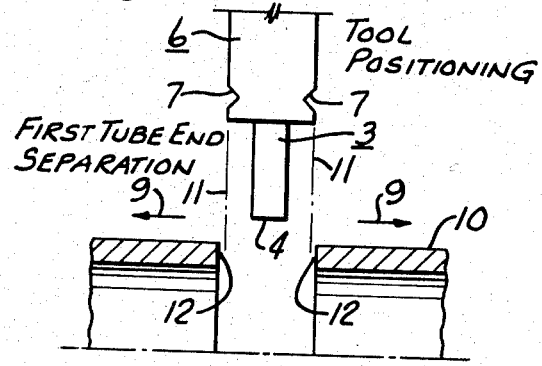
Fig. 1c First Tube End Separation — Tool Positioning
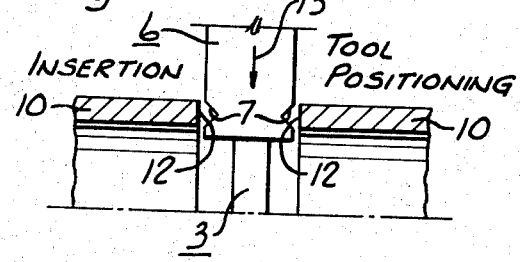
Fig. 1d Insertion — Tool Positioning
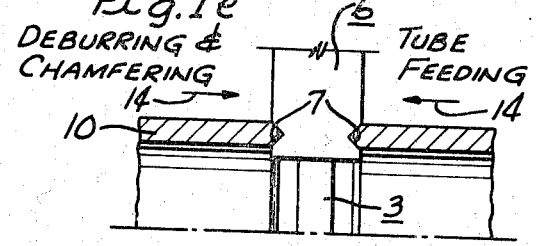
Fig. 1e Deburring & Chamfering — Tube Feeding
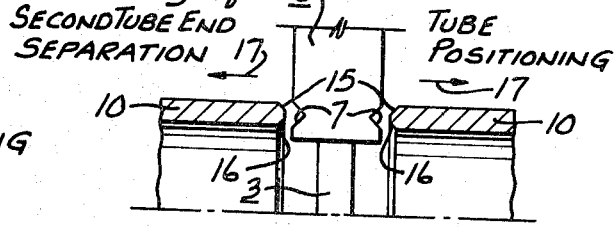
Fig. 1f Second Tube End Separation — Tube Positioning
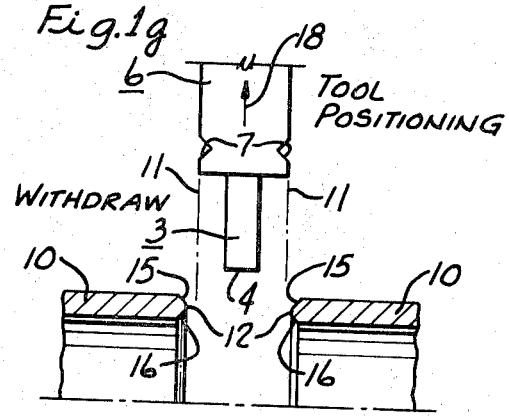
Fig. 1g Withdraw — Tool Positioning
Fig. 10
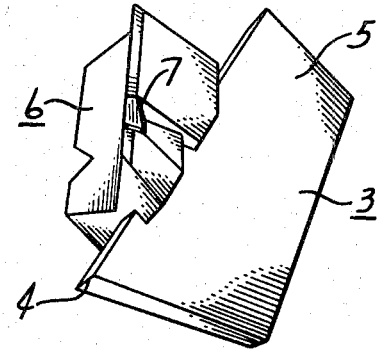
INVENTOR.
ALEX SHASHATY
BY
CAROTHERS & CAROTHERS
HIS ATTORNEYS

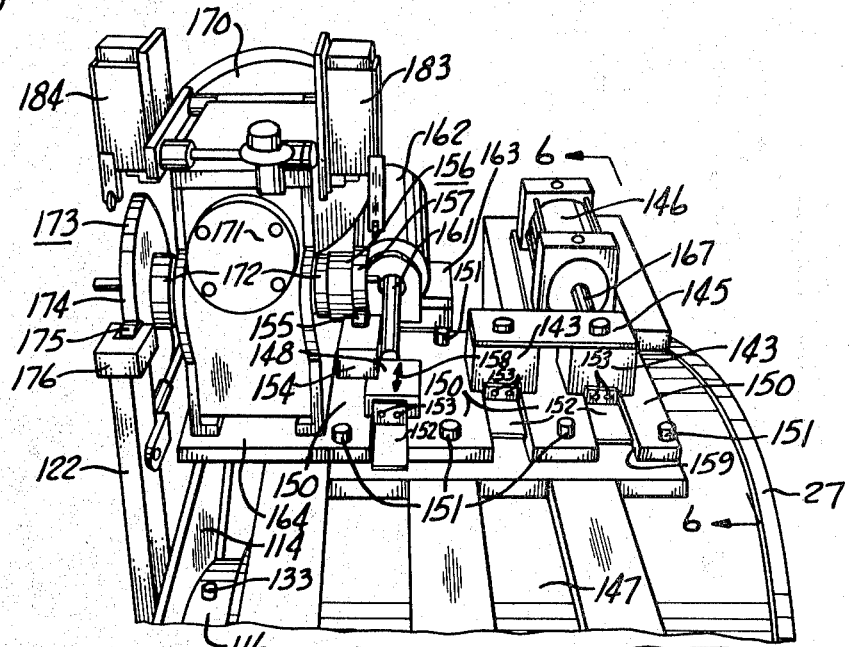

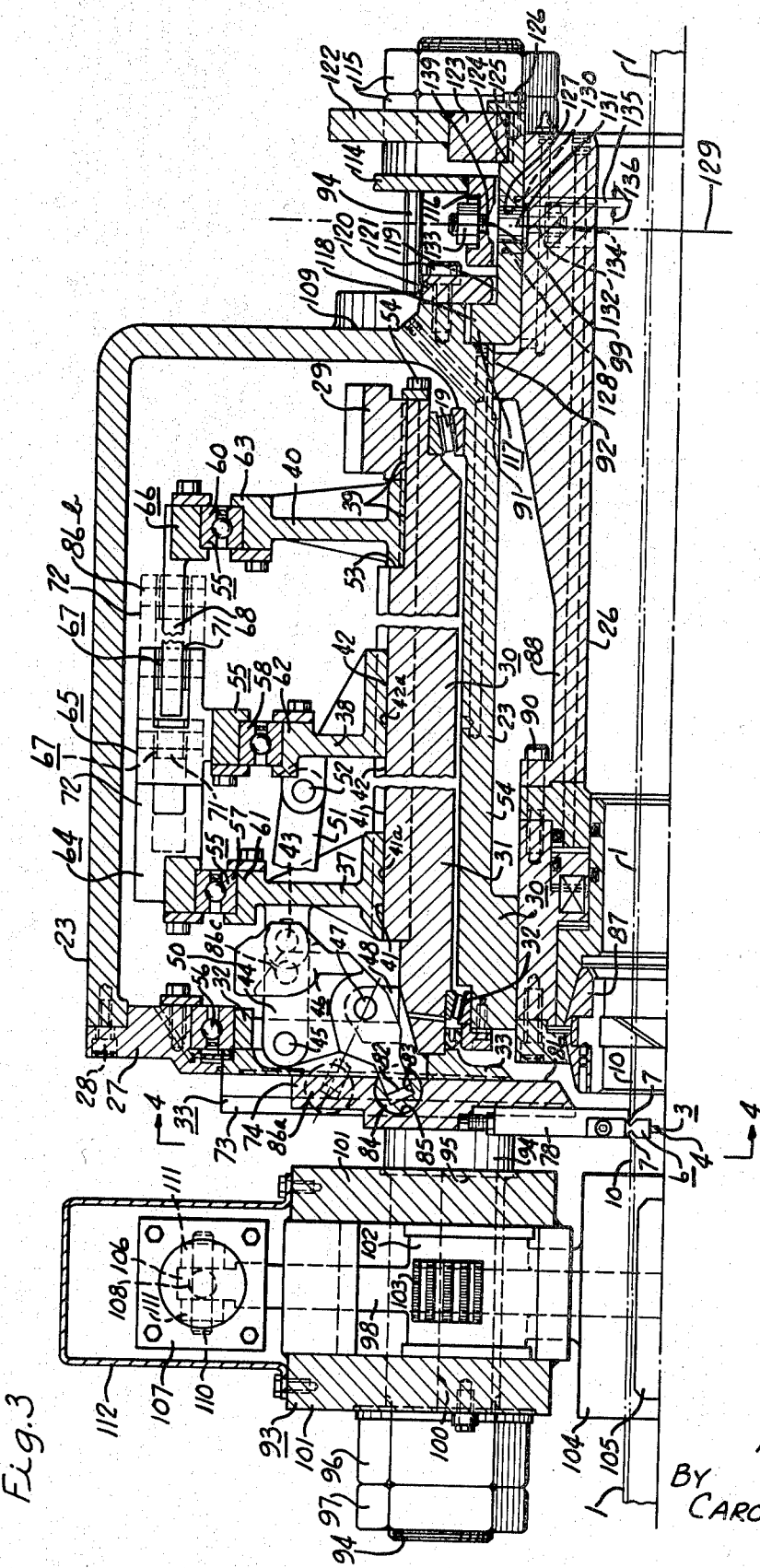

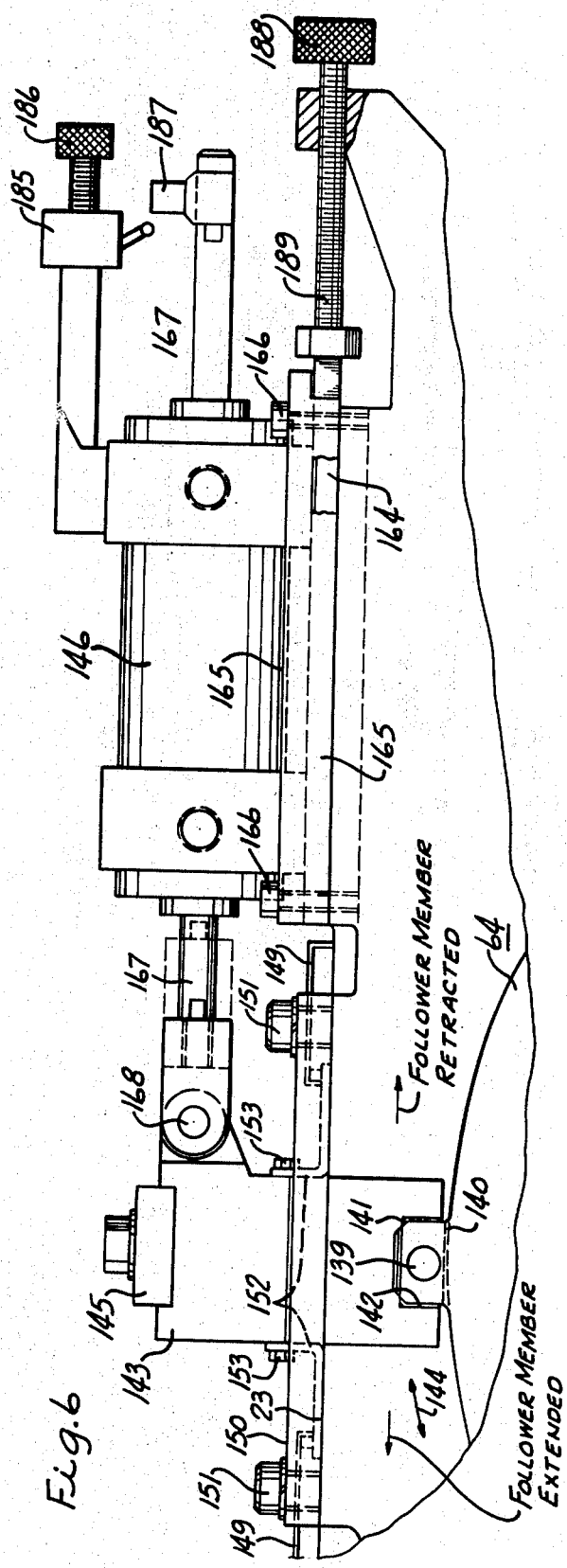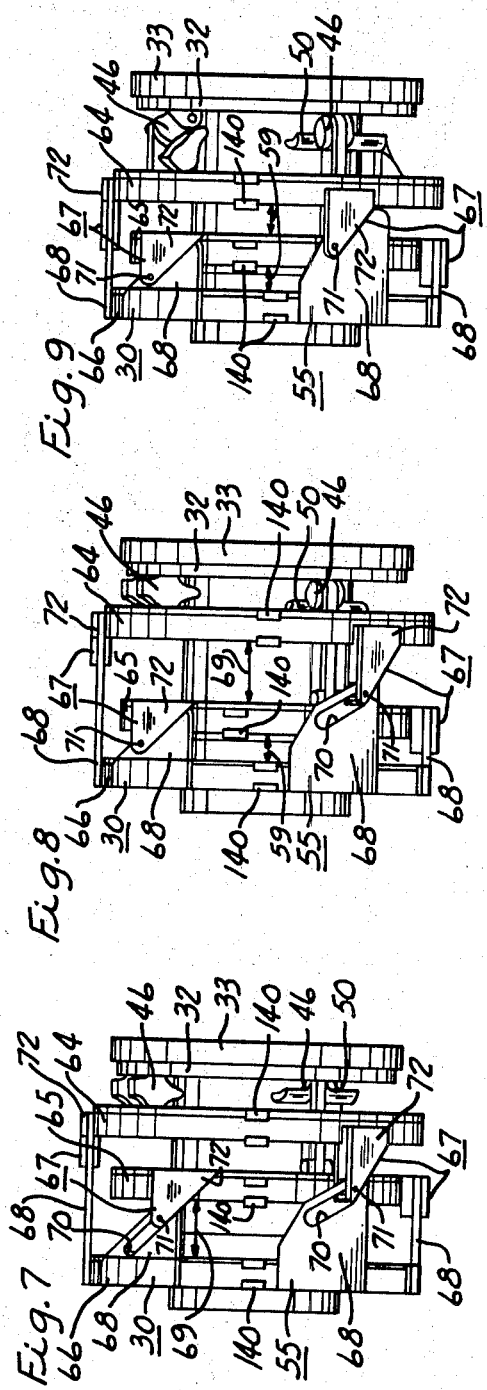

3,563,119
METHOD FOR CUTTING TUBE MEMBERS AND FINISHING SELECTED OF THE CUT TUBE EDGES AT A SINGLE STATION
Alex Shashaty, Youngstown, Ohio, assignor to Fairfield Machine Company, Inc., a corporation of Ohio
Filed Apr. 3, 1969, Ser. No. 813,041
Int. Cl. B23b 1/00, 3/00
U.S. Cl. 82—1  16 Claims

ABSTRACT OF THE DISCLOSURE

In a cutoff machine, means are provided for sequentially cutting a tube member at a selected point of cutoff and chamfering selected of the tube edges, as cut, at a single station. The tube is positioned for cutoff within the cutoff machine and thereafter is gripped by independent chuck means adjacent both sides of the selected point of cutoff. Upon completion of the cutoff operation at the selected cutoff point, the cut tube ends are separated while the same are still being firmly gripped by independent chuck means. Selected of the cut tube edges may be dressed or finished, such as, by chamfering by inserting, in aligned relation between the separated cut tube ends, a chamfering tool. Then the independent chuck means are operated to draw together the separated tube ends into the aligned chamfering tool to complete the chamfering operation.

BACKGROUND OF INVENTION

This invention relates primarily to the pipe machinery field and is more particularly concerned with severing or cutoff apparatus (Class 82) of the type having a hollow cutter head (Subclass 20) and interrelated means for tool feed and circumrotation (Subclass 59 et. seq.).

Cutoff machines or apparatus for severing members into selective lengths is one of the oldest known type of equipment in the metal working field. Various cutoff machinery has been developed to automatically feed pipe or tube members, and, for that matter, any other type of elongated hollow or even solid annular members, into cutoff apparatus wherein the member is cut off at a selected length and thence conveyed out of the cutoff apparatus to another metal working station wherein the member is further worked upon, such as, finishing or dressing the tube ends to produce a desired end product. Specifically, in the pipe or tube metal working art, tubes cut to selective lengths may be further worked upon by facing, deburring, chamfering or threading the cut tube ends. In order to perform all these different types of operations particularly in performing the finishing operation of chamfering that are desired, it has been necessary to provide separate operations, first to cut the tube members into selective lengths and, secondly, chamfer the tube ends, as cut.

Reference made herein to "tube" or "tube members" is intended to a tubular shaped body, such as, pipe, conduit, etc. and also solid annular bar members where after cutoff, outside chamfering is desired on the external edge.

There are principally two types of cutoff apparatuses for cutting off tubular or bar members. One type of such apparatus utilized the principle of initially gripping the workpiece and thereafter rotating the work within a hollow cutter head. The cutting tools are then advanced radially into the rotated work to perform the desired cutoff operation. Today, this is the least desired method of cutoff because of the whipping and vibration produced by revolving elongated slip workpieces. Such whipping action also may mar the finished product which may be undesirable depending upon the application to which the finished workpiece is to be finally employed. Also, such a developed whipping action on the workpiece may cause it to bend or become slightly crooked which is highly undesirable.

The second type of cutoff apparatus utilizes the principle of initially gripping the workpiece within a hollow cutter tube head and the latter rotated about the stationary workpiece. Means is provided for the cutting tools to be advanced into the workpiece to effect the cutoff operation. An example of this type of apparatus is the patent of Abbey, 2,616,325 (82–20). Thus, it is desirable to employ this type of cutting apparatus in order not to injure or mar the workpiece and at the same time be able to provide means for subsequent finishing of the cut tube ends of the workpiece after effecting cutoff.

The cutoff apparatus comprising this invention consists of the more preferred design, mentioned above as the second type, wherein the tool head is rotated about the stationary workpiece. However, the method and apparatus employed herein can be utilized with respect to either type of cutoff apparatus mentioned.

In recent times, apparatus has been provided in cutoff machinery not only to cut tube members at selected points of cutoff but also face, deburr or chamfer selected edges or faces of the cut tube ends. However, such cutoff machinery including means to perform working operations on the tube ends, as cut, has been seriously hampered by the fact that it becomes very difficult to properly work on the cut tube ends to perform a finishing operation after the cutoff operation has been performed. The tube sections, as cut and gripped interfere with the possibility of providing a complete finishing operation. A prime example of the difficulties encountered is the inability to deburr or chamfer the internal cut edges of the cut tube ends after cutoff. Cutoff apparatus has been designed to initially chamfer the external cut edges of both tube ends at the selected cutoff point, or chamfer either the external edge or internal edge of that portion of the tube section still chucked within the cutoff apparatus after the cutoff operation has been performed and the other cut tube section has been dropped away. However, there has been no method or apparatus by which means have been provided for deburring or chamfering selected of the tube edges after the cutoff operation has been effected, all at a single station. It is the principal object comprising the present invention to provide such means which is not only selective as to the tube edges that may be worked upon after effecting the cutoff operation but also provide means wherein, after the cutoff operation has been performed, the external edges and the internal edges of both cut tube ends while still positioned and gripped within the cutoff apparatus may be simultaneously deburred or chamfered as desired.

Reference hereinafter to the term "chamfering" is intended to include finishing operations referred to as "beveling" and "deburring" in the metal working art since these operations are merely specific operations included in the more generic term "chamfering." Reference to "finishing" is intended to include such operations as facing, grooving chamfering, beveling and deburring.

As indicated above, there are various types of apparatus existing today wherein means have been provided for some metal working or finishing operation of the tube member ends at a single station after the cutoff operation has been completed. Examples of such apparatus are found in the following patents: Goebel, 1,897,374, Feb. 14, 1933; Guirl et al., Re., 20,974 (82—20,) Jan. 10, 1939; Rodder, et al., 2,604,690 (29—33), July 29, 1952; Abbey, 2,616,325 (82—20), Nov. 4, 1962; German Pat. R 15,706, Oct. 27, 1955.

Goebel shows tube cutting apparatus provided with means for not only cutting the tube member at a selected point of cutoff but also means to deburr the external edges of the tube ends as cut. However, Goebel is incapable of deburring chamfering or otherwise finishing the internal edges of the tube ends, as cut, without providing some additional operation.

The patent to Guirl et al. discloses a cutoff apparatus which may also be provided with special tool holders for chamfering the internal and external tube edges of the tube ends still chucked in the cutoff apparatus. However, the cutoff apparatus is designed in such a manner as to be incapable of providing for metal working or finishing, in any manner, the adjacent cut tube ends and, therefore, additional apparatus at another working station, as a secondary operation, must be provided for properly finishing the cut tube ends of the tube members initially cut to selective lengths.

The patent to Rodder et al. provides for cutoff apparatus as well as means for thereafter finishing the internal edges of the cut tube ends. However, Rodder et al. does not provide for apparatus wherein selective of all of the tube edges of both tube ends, as cut, may be finished at a single station requiring an additional operation to complete chamfering of the internal edges of the other tube section.

The patent to Abbey provides a cutoff apparatus with tool means for chamfering the external edge of the cut tubular ends still held within the cutoff apparatus. However, no means are offered whereby the external cut edge of the other tubular cut member together with the internal edges of both tubular members, as cut, can be properly finished at the single station represented by the cutoff apparatus.

Like many of the previous cutoff apparatuses referred to, the German patent, above mentioned, provides for manipulation of cutoff tools in combination with chamfering tools at a single station. However, the apparatus is limited to the most accessible cut tube edges, the external edges of both cut tube ends, this finishing operation easily accomplished at the point of cutoffs.

As previously indicated, cutoff apparatus may be provided with tool holders at the cutoff machine tool face having chamfering tools capable of placing an outside chamfer without difficulty on both workpieces, as cut. Such chamfering tools are first advanced to the point of cutoff and the chamfer is made in the form of an annular V-shaped groove at selected cutoff point. Then sequentially, the cutoff tools are advanced to perform the cutoff operation. However, no means is provided after the cutoff operation wherein both halves of the workpiece, while being firmly gripped, may be provided with an internal chamfer on the internal edges of each of the tube edges of the cut tube sections.

By the same token, as indicated above, it is possible to put a chamfer or bevel on the cut tube end still gripped within the cutoff apparatus. Since most finished products, such as pipe or tubing, require a chamfer or bevel on the part of the tube remaining in the cutoff apparatus, means may be provided to be brought into position to chamfer either the external edge or internal edges of this tube end or, for that matter, simultaneously both the external and internal tube edges of this tube end. However, since most types of finished tube products require chamfering on both the inside and outside cut edges of both ends of the tube member ends, as cut, an additional operation is still needed to provide for chamfering of the tube end of that tube section not gripped or chucked within the cutoff apparatus. As a result, a secondary operation is provided wherein chamfering is made complete as to all cut tube edges.

It is the primary feature of the present invention to provide a method and apparatus for cutting tubular members into selected lengths and thereafter chamfering both the internal and external edges of both tube ends after effecting the cutoff, all in a single sequentially conducted operation at a single station.

Besides the prior art references previously mentioned, the patent to Gest et al., 2,262,178 (82—20), is the most pertinent. Gest provides a cutoff and facing tool apparatus wherein, after the cutoff operation has been completed, facing tools in adjacent tool holders in the tool face plate of the cutoff apparatus may be advanced into the workpiece at the point of selected cutoffs afterwhich the entire tool face plate is moved longitudinally in opposite directions relative to the axial length of the tube member, while the cut tube sections are firmly clamped, in order that both tube ends may be faced without any additional operation. Thus, Gest et al. does provide an apparatus whereupon completion of the cutoff operation, additional dressing or finishing at the cut tube ends may be accomplished, specifically tube end facing. However, it is a more complex and preplexing problem in the art to accomplish the internal chamfering of the internal cut edges of the cut tube ends at the cutoff station since facing is only with regard to the cut tube end faces. This is the disadvantage of Gest et al. in that the insertion of a finishing tool between the cut tube ends is limited to the width of the cutting tool. In order to properly provide for an internal chamfer at the place of cutoff, the width of actual cutoff would have to be obviously sufficient to permit the insertion of chamfering tools to chamfer both inside edges of both cut tube ends. This type of cutoff would be highly undesirable because of not only the additional metal that must be cut away at the point of selected cutoff requiring additional power needs in the cutoff apparatus to make the larger cutoff width in order that the chamfering tools may be inserted sufficiently within and between the cut tube ends after cutoff, but also requiring a cutoff tool of unusual width making it impractical to effect cutoff without frequent tool breakage. A more efficient cutoff operation is obtained with the use of narrower cutoff tools since high speed operation of the cutoff apparatus can be employed with minimum of horsepower requirement.

Thus, as will be clear hereinafter, it is the principal object of the present invention to provide a cutoff apparatus wherein, at the point of cutoff while the tube ends, as cut, are being firmly gripped by independent chuck means, the cut tube ends are separated to permit the insertion by further operation of the cutoff apparatus, a chamfering tool or other type of metalworking tool to perform the desired finishing of the tube ends while the cut tube sections are in their separated position or while they are again drawn together in toward the tool to perform its finishing operation.

SUMMARY OF INVENTION

The principal object of this invention is the provision of means for sequentially cutting a tube at the selected point of cutoff and thereafter chamfering selected of the tube edges, as cut, all at a single station wherein the means provides for gripping the tube adjacent both sides of the selected point of cutoff so that upon the performance of the cutoff operation, carriage control means may be provided to separate the tube ends while the same are being firmly gripped so that a finishing tool may be inserted in aligned relation between the cut tube ends and thereafter the carriage control means may be operated in such a manner as to permit the finishing tool to perform the finishing operation on the cut tube end. In the case of providing a chamfer on the internal and external cut tube edges, the chamfering tool may be inserted in aligned relation with the adjacent cut tube ends while the cut tube sections are in their separated position and thereafter be drawn together by operation of the carirage control means to bring about simultaneous chamfering of all internal and external edges of both cut tube ends, if desired.

The finishing tools can be operated in such a manner by the apparatus comprising this invention so that only selected of the cut edges of either or both of the tube ends after performance of the cutoff operation can be worked upon by the finishing tool. Thus, in employing a chamfering tool, it may be desired that only the internal cut edges of both tube ends be chamfered. One or more tool holders in the tool face plate may be provided with a chamfering tool which, upon separation of the cut tube ends by independent chuck means, the chamfering tools can be inserted in aligned relation relative to the internal cut edges of both tube ends and thereafter the tube ends can be drawn together toward the internal chamfering tool to a predetermined position for proper engagement by the tool to provide a chamfer on the internal edges of both cut tube ends. There being a possibility of chamfering four tube edges after a single cutoff operation, only selected of these tube edges need be chamfered or otherwise finished in the manner desired by employing the proper chamfering tools in the tool holders positioned on the tool face plate in the cutoff apparatus.

Another object of the present invention is the provision of the method of cutting a tube and thereafter finishing selected of the tube edges of the adjacent cut tube ends, such as chamfering at a single station consisting of initially gripping the tube adjacent both sides of selected point of cutoff, feeding a cutting tool radially inward of the tube to cut the tube at the selected point of cutoff, withdrawing the cutting tool upon completion of cutoff, separating the cut tube ends while the same are being still firmly gripped, inserting a chamfering tool between and in aligned relationship with the cut edges of both tube ends, drawing together the separated tube ends toward the chamfering tool to a predetermined position for proper engagement by the tool to chamfer the selected tube edges of both cut tube ends, separating again the gripped tube ends and thereafter withdrawing the chamfering tool from between the tube ends.

Another object of the present invention is the provision of means for sequentially cutting a tube at a selected point of cutoff and thence chamfering selected of the tube edges, as cut, at a single station wherein independent chuck means are applied to respectively grip the tube adjacent both sides of the selected cutoff point. Carriage control means are provided to impart to the independent chuck means independent but opposed oscillatory motion so that the chuck means may be drawn away from one another or drawn towards one another a limited distance so that the cut tube ends after performance of the cutoff operation may be separated to permit the insertion, tube edge alignment and final withdrawal of the finishing or chamfering tool from between the tube ends after the finishing operation has been performed.

Another object of the present invention is the provision of an externally operated equalized scissor tube chuck having downwardly open chuck jaws to permit grasping of one side of the workpiece during cutoff and while the tube end finishing operation is being performed and, upon actuation of the chuck jaws, releasing the finished tube section to gently drop on a conveying device to be carried away from the cutoff apparatus.

Another object of the present invention is the provision of novel tool actuator means to selectively control the radial motion of the tool holder slides in the tool face plate so that various types of cutting and finishing tools may be employed in any desired sequence of operation in order to perform not only the cutoff operation but also any desired finishing operation, such as chamfering. Also the tool actuator means may be operated in such a manner that all radially movable tool holder slides may be operated in unison to perform a single operation or employ special tools that are capable of performing a sequence of operations intermittently with the operation of the carriage control means mentioned above, such as the chamfering operation.

Another important feature comprising this invention is a combined tube cutting and chamfering tool comprising a shank having at one end thereof a cutting bit for tube cutoff. A double chamfering bit is provided on adjacent sides of the shank of the tool inwardly of the cutting bit. In employing the combined tube cutting and chamfering tool in the tool holder slide of the tool face plate, tool holder slides may be operated in unison, first, to perform the cutoff operation and then, second, upon separation of the cut tube ends by the carriage control means while the tube ends are being firmly gripped by the independent chuck means, permit insertion of the chamfering segment of the combined tool in proper alignment with the cut tube edges so that upon introgression of the cut tube ends towards one another into the double chamfering bit of the combined tool, simultaneous chamfering of both the internal and external cut edges of both tube ends may be accomplished with a single cutoff and chamfering tool in a single sequence of operation at a single station.

In summary, it can be seen from the foregoing that the principal feature comprising this invention is the gripping of a tube at two places on both sides of the rotating cutoff tool, the gripping chucks being capable of moving both cut tubes longitudinally toward and away from one another in a controlled manner along the central axis of the tube to allow a secondary or finishing tool to move into the gap produced by the tube end separation and then, at a controlled rate, draw together the tube ends into the finishing tool in order that the finishing operation may be accomplished. In the case of chamfering, the employment of means to move and separate and then draw together the cut tube ends is highly important for, otherwise, it becomes highly impossible to accomplish an inside bevel or chamfering on both cut tube ends to a predetermined desired depth of bevel.

In connection with the above, it is also within the contemplation of this invention to provide for tube separation after effecting cutoff by moving one tube section away from the other tube section to permit the insertion of the finishing tool between the cut tube ends. The finishing tool may be aligned relative to the tool face plate for proper insertion between the separated cut tube ends through manipulation of only one tube section. On the other hand, the tool face plate may be provided to move in a manner exemplified in the above mentioned patent reference to Gest et al. so that the finishing tool may be properly aligned between the separated tube ends through manipulation of only one tube section.

Other objects and advantages appear hereinafter in the following description and claims.

The accompanying drawings shown, for the purpose of exemplification without limiting the invention or the claims thereto, certain practical embodiments illustrating the principles of this invention wherein:

FIG. 1a through FIG. 1g are a series of diagrammatic views showing the sequence of operation of the tool positioning, tube positioning, and tool and tube feeding operations incorporated by the cutoff apparatus comprising this invention.

FIG. 2 is a perspective view of the cutoff apparatus comprising this invention.

FIG. 3 is a longitudinal view of the cutoff apparatus of FIG. 2 with parts thereof shown out of position.

FIG. 4 is a transverse view taken along the line 4—4 of FIG. 3.

FIG. 5 is a view of the top of the cutoff apparatus housing showing the cam operate mechanism for controlling the tool and tube positioning and feeding sequenced operations.

FIG. 6 is a partial sectional view taken along the line 6—6 of FIG. 5.

FIG. 7 is a plan view with the cutoff apparatus housing removed of the tool operating follower and cam ring members with the follower ring members in their furthest most extended position.

FIG. 8 is a plan view similar to FIG. 7 with one follower ring member in its furthest most extended position and with the other follower ring member in its furthest most retracted position.

FIG. 9 is a plan view similar to FIG. 7 with both follower rings in their furthest most retracted position.

FIG. 10 is a detailed perspective view of the combined cutting and chamfering tool comprising this invention.

FIG. 1 represents a series of diagrammatic views showing the sequence of operation in accordance with the method comprising this invention. Although the specific embodiment as shown and demonstrated in FIG. 1 has reference to the finishing operation referred to as chamfering, and includes the chamfering of all cut edges of both tube ends at the point of cutoff, it should be understood that the apparatus herein disclosed can be employed to chamfer selected of the tube edges of the adjacent cut tube ends rather than all such edges in unison. Furthermore, even though reference is being made herein generally with respect to the finishing operation of chamfering because of the problems experienced in the cutoff and end treatment of workpieces in the prior art, particularly in performing an internal chamfering on the internal edges or diameter of the tube ends, other finishing tools, such as facing tools, special deburring tools, etc. could be employed in the sequence of operation as illustrated diagrammatically in FIG. 1.

In the sequence of operation shown in FIG. 1, the combined cutting and chamfering tool comprising this invention is employed. However, the sequence of operation can be performed by independent cutting and chamfering tools wherein, for example, one pair of tool holders on the tool face plate can be provided with cutting tools whereas another radially adjacently disposed pair of tool holders can be provided with chamfering tools.

As shown in FIG. 10, the combined cutting and chamfering tool 3 is provided with a cutting bit 4 at one end of the tool shank 5. The double chamfering bit 6 is provided on adjacent sides of the shank 5 inwardly of the cutting bit 4. The double chamfering bit 6 consists of the chamfering bits 7 which are in the form of V-shaped chamfering grooves. The V-shaped chamfering grooves are disposed in such an angular relationship relative to the shank 5 of the cutting tool 3 as to permit proper alignment of the double chamfering bit 6 relative to the internal and external cut edges of the cut tube ends. This angular relationship is clearly illustrated in FIG. 4. Obviously, this angular relationship is also dependent upon the angle of dress of the cutting tool to the workpiece, which is well known in the prior art, and is all dependent upon the particular type of metal that is being cut.

The sequence of operation is as follows. The tube 1 is firmly gripped by independent chuck means on adjacent sides of the selected point for cutoff generally indicated at 2. This gripping of the tube is maintained throughout the sequence illustrated in FIGS. 1a through 1g. In FIG. 1a the cutoff operation is shown wherein the cutting tool is advanced radially inward towards the center of the tube to cut the tube at the selected cutoff point tube. The arrow 4a in FIG. 1a illustrates the feeding action of the cutting tool 3 into the tube 1.

Upon completion of the cutoff operation, the cutting tool 3 is withdrawn (FIG. 1b) as demonstrated by the arrow 8 and, thus, represents a tool positioning function as compared to tool feeding function demonstrated by the arrow 4a in FIG. 1a.

The next function is a tube positioning function as demonstrated in FIG. 1c wherein the cut tubes 10 are separated in sufficient distance, while being firmly gripped, the distance of separation dependent upon the width of the double chamfering bit or tool 6 as indicated by the dotted lines 11 in FIG. 1c.

The tube positioning function is then followed by a tool positioning function as demostrated in FIG. 1d wherein the combined cutting and chamfering tool 3 is inserted in between the cut tube ends 12 of the tubes 10 as demonstrated by the arrow 13. The tool is positioned between tube ends 12 in such a manner that the chamfering bits 7 are in line with the tube ends or edges 12.

The next step is the actual deburring or chamfering of the tube ends 12 as represented by the tube feeding function shown in FIG. 1e. Here, the tube sections 10 are set inwardly toward the chamfering bits 7 in a controlled manner as indicated by the arrows 14 to a predetermined position for engagment by the chamfering bits to put on both the external and the internal edges 12 the chamfer 15 and 16, respectively, of both tube sections 10 as shown in FIG. 1f.

After the chamfering operation has been completed and the desired chamfer of sufficient depth has been placed on the tube ends 12, a tube positioning function is then performed as indicated in FIG. 1f wherein the tube sections 10 are separated as indicated by the arrows 17 to permit withdrawal of the chamfering tool from between the tube sections 10 as illustrated in FIG. 1g and as exemplified by arrow 18. Thus, the withdraw of the tool as shown in FIG. 1g is a tool positioning function.

From the foregoing, it is evident that there are seven basic functional steps in performing a complete sequence of operation, three of the steps involving tool positioning, two of the other steps of the sequence involving tube positioning and, then, two steps respectively involving tool feeding and positioning and tube feeding to perform the cutting and chamfering operation.

In order to provide for a method of cutting a tube at a selected point of cutoff and thereafter chamfering the selected of the tube edges of the adjacent cut tube ends all at a single point, it is necessary to provide means by which the tube 1 is gripped on adjacent sides of the selected point of cutoff so that the tube may then be cut at the selected cutoff point. Then the tube sections 10 may be separated a sufficient distance while being firmly gripped to permit the insertion and alignment of the chamfering tool and thereafter drawing together the separated tube sections 10 toward the chamfering tool to perform the chamfering operation. These basic steps represent the primary feature of operation comprising this invention. The chamfering operation can be performed by tool positioning and alignment or tool reciprocation upon alignment.

Reference is now made more particularly to FIGS. 2, 3 and 4 to explain the cutoff apparatus together with the means used to perform the functional operation as specifically spelled out above.

As shown in FIG. 2, the cutoff machine is generally shown at 20 and is provided with the base 21 which houses the hydraulic system including hydraulic pumps to operate the fluid motors which power operate the cutting operation as well as the chuck gripping and chuck releasing, and oscillatory chuck carriage operations. Electric motor 22 operates the fluid pump in the housing 21 to provide fluid pressure for this operation.

The cutoff apparatus 20 is mounted within the housing 23 provided on the machine base 21.

Conveying apparatus 24 is provided with rollers 25 to convey the tubes 1 into the aligned opening 26 of the cutoff apparatus 20. As well known in the cutoff art, the tube 1 is conveyed through the cutoff apparatus opening 26 a sufficient distance on the opposite end of the apparatus wherein the forward end of the tube 1 comes in contact with a tube stop which stops the tube at a selected point of cutoff within the cutoff apparatus 20 and, at the same time, functions to actuate a limit switch at the tube stop to commence the sequential operation previously referred to in connection with FIG. 1.

As shown in FIG. 3, the upper portion of the cutoff apparatus housing 23 is generally U-shaped in cross-section and is provided with a forward annular enclosure plate 27 secured as shown at 28 with mounting bolts to the housing 23. In the housing there is mounted the rotary tool head assembly 30 the major portion of which is supported by the rotary spindle barrel 31 on the bearings 32, 19 and 56 on the innerhousing section 54 of the housing 23. Tool actuator means 55 represents a portion of this assembly 30. The spindle barrel 31 is provided with a forward annular web plate member 32 to which is secured the rotary tool face plate 33. The rearward end of the spindle barrel 31 is provided with the drive gear 29 which is driven by a cooperative gear (not shown) on the drive shaft 34. As shown in FIG. 2, the drive shaft 34 at its outer end is provided with the drive gear 35 driven by the belt 36 which is driven by a fluid operated motor (not shown).

The rotating tool head assembly 30 also includes the forward movable spider member 27, intermediate movable spider member 38 and rearward fixed spider member 40. These spider members are similar in design to a structural web member. The spider members 37 and 38 are respectively movable within the single keyways 41 and 42 positioned longitudinally on the surface of the spindle barrel 31. At this point it should be noted that in connection with movable spider member 38, this member is shown out of position by 60° relative to spider member 37 for the purposes of illustration of the invention. The actual relative position of the movable spider members 37 and 38 relative to one another is more clearly illustrated in FIGS. 7, 8 and 9.

The annular base of the movable spider members 37 and 38 engage the annular surface of the barrel 31 for slidable engagement therealong. In order to ensure that these members rotate with the barrel 31, the keyways 41 and 42 are provided to receive the respective key guides 41a and 42a on the spider members 37 and 38 interlocking these members to the barrel 31 but permitting their longitudinal movement on the barrel 31.

The forward movable spider member 37 is secured at 43 to the operating link 44, the forward end of which is pivotally secured at 45 to the tool slide operating lever 46. The tool slide operating lever 46 is pivotally secured to the spindle barrel 31 at 47 on the standard 48. The upper portion of the tool slide operating lever 46 may be provided with a counterweight 50 in order that the tool slide operating lever will operate effectively against the forces of inertia developed by high speed rotation of the rotary tool head assembly 30.

Although not shown, the movable spider member 38 is also secured to a tool slide operating lever 46 of the type shown in FIG. 3 by means of the operating link 51 secured to the movable spider member 38 at 52.

The fixed spider member 40 is secured on the spindle barrel against the shoulder 53 of the spindle barrel 31 by means of the bolt and clamp arrangement 54 which also holds the drive gear 29 in its proper position on the spindle barrel 31 against the fixed spider member 40 against the spindle barrel shoulder 53. As shown in FIG. 3, both the spider member 40 and the drive gear 29 are keyed to the spindle barrel at 39.

All these components of the rotating tool head assembly 30 are rotatable around the inner housing section 54 of the housing 23.

Explanation now will be made concerning that portion of the tool actuator means 55 which does not operatively rotate with the tool head assembly 30. In this connection, mention should be made of the fact that the tool actuator means 55 includes the movable and fixed spider members 37, 38 and 40 as well as the operating links 44 and 51 together with the tool slide operating levers 46 which are actually part of the rotating tool head assembly.

Above the spindle barrel web plate member 32 there is the annular antifriction bearing 56. Also, as shown in FIG. 3, annular antifrictional bearings 57, 58 and 60 are provided on the outer annular portions 61, 62 and 63 of the respective spider members 37, 38 and 40. These annular bearings 57, 58 and 60 respectively support the follower ring members 64 and 65 and the cam ring member 66. Ring members 64, 65 and 66 are also shown in FIGS. 7, 8 and 9. Cam and follower linkage means 67 is provided between each of the follower ring members 64 and 65 and the cam ring member 66. In each instance, this linkage means 67 consists of the plate member 68 secured to the cam ring member 66 and have a diagonal slot 70 which receives the follower member 71 positioned between the outer end of the bifurcated plate members 72. Upon examination of FIGS. 7, 8 and 9, it will be clear that upon rotary movement of any of the ring members 64, 65 and 66 on their respective bearings 57, 58 and 60 about the rotary axis of the cutoff apparatus, the involved follower ring member 64 or 65 will be moved in an axial direction relative to the axial center of rotation of the cutoff apparatus 20 due to the movement of the followers 71 in the diagonal slots 70 in the cam ring member plates 68. In immediate reference to FIG. 3, it becomes clear that depending upon the follower ring member 64, 65 that has been rotated relative to the cam ring member 66, the movable spider members 37 or 38 will be caused to move along their respective ways 41 or 42 and, thus, operate their tool slide operating levers 46 through their respective operating link 44 or 51. The rotary operation of the respective follower ring members 64 and 65 as connected to the independent movable spider members 37 and 38 as well as tool slide operating levers 46 permit separate independent operation of pairs of tool holder slides 74 mounted on the tool face plate 33. In this manner the rotary operation of the follower ring members 64 and 65 can be sequenced in such a manner that a pair of such tool holder slides 74 may be provided with cutting tools whereas the other such pair of tool holder slides 74 may be provided with finishing tools, such as a chamfering tool. With the operation of the follower ring members 64 and 65 operated in consecutive sequence, the cutting tools can be initially advanced to perform the cutoff operation and thereafter withdrawn to permit operation of the second follower ring member to align the finishing tool relative to the cut tube sections so that the finishing operation can be performed. By the same token, the operation of the follower ring members 64 and 65 can be tied together so that all tool slide operating levers 46 operate in unison rather than in separate pairs. This will be explained in detail in conection with FIGS. 5 and 6. Thus, from the foregoing it is readily apparent that tool actuator means 55 comprising the operation of the ring members 64, 65 and 66 together with the movable spider members 37 and 38 linked to their respective operating levers 46 is constructed in such a manner as to be capable of operating the tool holder slides on the tool face plate 33 in any desired sequence of operation giving the cutoff apparatus comprising this invention a versatility of tool holder slide sequencing not previously available in the prior art. This versatility resides in the ability of being able to program the tool actuator to perform the tool aligning and tool cutting and finishing operations.

Operation of the follower ring members 64 and 65 relative to the cam ring member 66 will now be explained.

As shown in FIGS. 7, 8 and 9, each of the ring members 64, 65 and 66 are provided with bifurcated lugs 140 by which they are rotatably operated by the structure shown in FIGS. 5 and 6. This structure as well as the lugs 140 have not been shown in FIG. 3 for the purposes of clarity.

As shown in FIG. 7, the lugs 140 are shown in an aligned position which may be referred to as a rest position. Upon rotation of the intermediate follower ring member 65, as shown in FIG. 8, its follower members 71 are caused to travel a portion of the length of the diagonal slots 70 in the corresponding plate members 68. Thus, ring member 66 has not only been rotated but also has moved to a rearward position longitudinally relative to the axial center of the rotary tool assembly 30 as exemplified by the small distance 59 between ring members 65 and 66 in FIG. 8 as compared to that distance 69 of ring member separation in FIG. 7.

In FIG. 9, ring member 64 has also been rotated from its original position as shown in FIG. 7, so that now lugs 140 of each of the ring members 64 and 65 are in aligned relation and are separated by appropriately the same distance 59. As in the case of ring members 65 and 66, the position of the ring members 64 and 65 in FIG. 9 is referred to as their full retracted position. When moved from these positions to their full extended position, they will move longitudinally forward relative to ring member 66 causing the operator levers 46 or FIG. 3 to move inwardly toward the center line of tube 1.

At this point, it should be made evident that if the follower ring members 64 and 65 were held fixed in their rest position as shown in FIG. 7, cam ring member 66 could be rotated in a downward direction, in reference to that figure, causing ring members 64 and 65 together with their spider members 37 and 38 in the ways 41 and 42 to move into their retracted positions as shown in FIG. 9.

Reference now is made in connection with the assembly for holding the tools on the tool face plate 33 of the cutoff apparatus 20.

As shown in FIGS. 3 and 4, the tool face plate 33 is provided with a series of radially positioned slots 73 to slidably receive the tool slides 74 which are held within the slots 73 by means of the gibs 75 secured to the tool face plate 33 by means of the screws 76. The tool holder 78 is adjustably mounted within the open slot 80 of the tool slide 74 and is provided with tool clamp 81 to removably secure the tool onto the tool holder. The tool holder 78 is provided with means for adjusting the relationship of the tool relative to the entire tool slide assembly in order that the tool be properly positioned to perform working operations on the workpiece. Such adjusting means are known in the art and therefore will not be set forth in detail since the adjusting structure does not involve the inventive features disclosed herein.

The forward end of the tool slide operating levers 46 are provided with a dog 82 which is slidably received in the slot 83 of the rotatable socket members 84. The rotatable socket members 84 are rotatably mounted within the horizontal arcuate slot 85 in the back face 86 of each of the tool slides 74.

The representation of the tool actuator means 55 as shown in FIG. 3, shows the tool slide 74 in its lowermost position, with the tube 1 having been cut into tube sections 10. The dotted representation generally shown at 86a illustrates the location or position of the tool slide 74 together with its socket member 84 when the tool actuator means 55 has operated to move the spider member 37 or the spider member 38 together with their respective follower ring members 64 and 65 in their innermost retracted position. This retracted position for movable spider member 38 is indicated in the dotted representation at 86b. When the follower ring member 65 together with the spider member 38 have assumed this position 86b, then the respective tool slide operating lever 46 will be in its uppermost position as indicated by the dotted representation of the socket member 84 at 86a. In this position the forward end of the respective operating link 44 or 51 will have assumed the dotted position designated at 86c.

As shown in FIG. 3, independent chuck means is provided to firmly grip the respective pipe sections 10. One chuck means is the internal hydraulically operated split collet chuck 87 mounted within the inner housing section 54 and is secured to the chuck support carriage 88 which is designed to impart to the chuck 87 longitudinal lineal but limited reciprocal motion which is further explained hereinafter. The chuck support carriage 88 is secured to the collet chuck 87 by means of the bolt 90. A keyway 91 is provided in the rearward end of the inner housing section 54 to receive the support carriage key 92 for slidable engagement within the keyway 91 to prevent the chuck carriage from rotating upon application of the cutting tools to the workpiece.

The other independent chuck means is in the form of the external scissor chuck 93 which is mounted on the support rods 94 and secured in position thereon against the shoulder 95 by means of the nuts 96 and locknuts 97. The scissor chuck 93 comprises two elbow-shaped arms 98, one of which is shown in FIG. 3. Each of the arms 98 are pivotally supported on the shafts 100 housed in the face plates 101. At the elbow 102 of each of the arms 98 there is provided on the inner surface thereof the gear teeth 103. The gear teeth 103 of each of the elbow arms 98 are constructed to interengage with one another to provide uniform equalized operation in the opening and closing of the scissor chuck 93. Thus, the scissor chuck 93 is at all times equalized so that the workpiece to be grabbed by the chuck is always held in aligned relationship relative to the axial center line of the cutoff apparatus 20 which is the same as the center line of the tube or other workpiece.

The lower ends of the elbow chuck arms 98 are provided with the chuck jaws 104 upon which is mounted the workpiece grippers 105. Scissor chuck 93 is, thus, provided with downwardly open chuck jaws 104 in order to firmly grasp the workpiece and, upon completion of the cutting and finishing operation, can release the workpiece upon which all metal working operations have been completed permitting the finished workpiece to position itself on conveyor means therebelow and thus be conveyed away.

The upper ends 106 of the elbow chuck arms 98 are respectively secured to opposite ends of fluid motor means 107 which may be a hydraulically operated piston and cylinder. As shown in FIG. 3, the elbow chuck arm 98 is shown with its upper end 106 secured to piston rod 108 of the motor means 107 by means of the threaded stud 110 and the nuts 111. A suitable cover or enclosure 112 may be provided over the motor means 107.

The external chuck support rods 94 as clearly depicted in FIG. 2, comprise the essential part making up the external chuck support carriage. The support rods 94 are slidably mounted in the bearing arms 113 which are secured in aligned pairs on opposite sides of the housing 23. While the external scissor chuck 93 is secured to the forward end of the support rod 94, the external chuck longitudinal operator 114 is secured to the rearward end of the support rods 94 by means of the lock nuts 115.

Reference is again made to FIG. 3 at the right-hand end thereof wherein the lower portion of the external chuck longitudinal operator 114 is shown. The bottom of the chuck longitudinal operator 114 is provided with the annular base plate 116 beneath which is positioned the chuck operating cam ring 117 secured against the rearward end 109 of the housing 23 by means of its flange 118 clamped in position by the annular clamp member 120, the latter of which is secured in position by means of the bolts 121. The chuck operating cam ring member 117 is provided with the operating lever 122 which has at its lower end the annular member 123 which is secured against the shoulder 124 as well as being keyed at 125 to the chuck operating cam ring member 117 by means of the clamping arrangement generally indicated at 126.

The chuck operating cam ring member 117 is provided with a series of transverse diagonal slots, one of which is indicated at 127. The longitudinal limits of slot 127 are indicated by the respective dotted line 128 and 130. The cam follower 131 which may be in the form of a roller member is rotatably positioned on the shaft 132 which is secured to the internal chuck support carriage 88 by means of the nut member 134. Cam follower 131 in FIG. 3 is shown at its midway position within diagonal slot 127.

Although not shown, there are four diagonal slots 127 in the annular surface 119 of the chuck operating cam ring member 117. These slots are formed in the surface 119 as opposed pairs, each slot of one opposed pair positioned in one diagonal direction and each slot of the other opposed pair positioned in an opposite diagonal direction in the surface 119. Thus, the angular relationship between the oppositely disposed pairs of diagonal slots is complementary relative to the plane 129 passing centrally through and normal the axial center of the chuck operation cam ring member 117.

In view of the foregoing, shaft 139 is shown broken away at 99 since this shaft has a cam follower 131 in a diagonal slot 127 positioned arcuately 90° around the annular surface 119 from the diagonal slot 127 shown in FIG. 3 as well as being positioned in a complementary opposite diagonal direction as mentioned above.

From the foregoing description it will become clear that upon operation of the cam ring member operating lever 122, the chuck operating cam ring member 117 is caused to rotate within and between the external chuck longitudinal operator 114 and the internal chuck support carriage 88 causing the cam followers 131 to move along their respective diagonal slots 127, in turn causing the external chuck longitudinal operator 114 and the internal chuck support carriage 88 to move in a longitudinal direction either to the left or the right upon viewing FIG. 3. For example, upon operating the cam ring operating lever 122 in a direction out of FIG. 3, the cam follower 131 shown in the figure will be caused to move towards its innermost limit 128, the motion of which causes rearward longitudinal movement of the internal support carriage 88 within the keyway 91 a distance indicated at 135 between the arrows 136. Thus when the cam follower 131 reaches its innermost limit 128, the internal chuck support carriage 88 will have moved the distance 135. The diagonal slots in the chuck operating cam ring member 117 being in an opposite complementary relationship to the diagonal cam slots for operation of the internal chuck support carriage 88, the external chuck longitudinal operator 114 will be caused to move in the same distance 135 forward or from right to left in FIG. 3 so that the external chuck support rods 94 are moved the same distance 135 from right to left upon viewing FIG. 3. Thus when the operating lever 122 is moved in a direction out of FIG. 3, the external scissor chuck 93 and the internal chuck 87 are caused to move in opposite directions away from one another.

The converse is also true that when the operating lever 122 is moved in the opposite direction into FIG. 3, the external chuck longitudinal operator 114 is caused to move from left to right upon viewing FIG. 3 whereas the internal chuck support carriage 88 is caused to move from right to left upon viewing FIG. 3. As a result, the chucks 93 and 87 are caused to draw together toward one another. Thus, the rotary operation of the cam ring operating lever 122 controls the reciprocal operation of the chucks 93 and 87 so that their longitudinal oscillatory motion is combined in such a manner that, depending upon the direction of operation of the lever 122, the chucks 93 and 87 will either simultaneously draw together toward one another or move independently away from one another a substantially identical distance.

Reference is now made to the structure through which the follower ring members 64 and 65 are operated relative to the cam ring member 66.

As shown in FIGS. 5 and 6 the tops of the follower ring members 64 and 65 are provided with the bifurcated lugs 140 to receive the pivotally supported cam follower block 141 mounted on the shafts 139 within the bifurcated portion of the lugs 140. The cam follower blocks 141 are thus allowed to slide within the slots 142 of the operator slide blocks 143. Such sliding motion within the slots 142 must be permitted in order that upon rotational operation of the follower ring members 64 and 65, as indicated by the arrow 144 in FIG. 6, relative longitudinal movement within the slots 142 permitted between the operator slide blocks 143 and the follower ring members since the follower and cam means 67 interconnecting each of the ring members 64, 65 and 66 will impart such longitudinal axial movement to the follower ring members 64 and 65.

It should be realized that the rotation of the ring members is not of large arcuate extent so that the follower blocks 141 may also move slightly upward or downward within the slots 142 as the operator slide blocks 143 are moved back and forth. Due to the size of the ring members, this upward and downward travel is not more than ⅛ of an inch.

As shown in FIG. 5, the operator blocks 143 are shown secured together for unison operation by means of the locking plate 145. Thus, only one fluid motor means 146 need be provided to operate in unison the operator blocks 143 for relative reciprocal motion since they are tied together by locking plate 145. However, a second fluid motor means may be mounted at 147 to be secured to the operator block 143 for the follower ring member 65 so that the other operator block 143 operated by fluid motor means 146 can operate follower ring member 64 independently of the operation of its adjacent follower ring member 65.

The cutting tool feed motor 146 which is a fluid operated cylinder and piston is secured to the base member 164 which in turn is mounted on the housing 23 by means of the gibs 165 and bolts 166 so that limited longitudinal adjustable movement can be made to motor means 146. The piston rod 167 of the fluid motor 146 is secured at 168 to the operator slide block 143 as shown in FIG. 6.

The rearward end of piston rod 167 is adapted, upon operation, to engage limit switch 185 secured to the rearward end of the housing of motor means 146. Adjustment of the length of the feed stroke of piston rod 167 of motor means 146 can be made by knob 186 which changes the relative distance between limit switch 185 and the piston rod contact element 187. Thus, knob 186 is an adjustment for length of the feed stroke of the tool slides 74, the length of which is dependent upon the wall thickness of the particular tube to be cut.

The base member 164 is adjustable by means of the knob 188 through connection rod 189. This adjustment initially positions the tool slides 74 so the tools 3 are positioned adjacent the outer surface of the tube 1. Thus, adjustment 188 is an outside tube diameter adjustment for commencement of the cutting tool feed operation through operation of piston rod 167.

It should be noted that an operator block 148 is also provided for the cam ring member 66 since the operator blocks 143 may be held in fixed position by fluid motor means 146. Fluid operating means could be mounted to operate the operator block 148 to functionally operate the tool actuator means 55. However, in the particular application shown, operator block is controlled by operation of the tool contour cam 156.

If the operator block 148 is operated relative to the secured operators 143, the follower ring members 64 and 65 will be caused to move relative to the cam ring member 66. By the same token, if the operator block 148 is held secure, then upon movement of either or both operator blocks 143, relative motion will be imparted to the follower ring members 64 and 65. The same relative action is imparted to the tool actuator means 55 whether the operator blocks 143 are held secure relative to the operator block 148 or vice versa as previously indicated in connection with FIGS. 7, 8 and 9.

Each of the operator blocks 143 and 148 are provided to slidably move on the plate guide members 150 secured to the top of the housing 23 by means of te bolts 151. Oil cover plates 152 are secured to adjacent sides of the operator blocks 143 and 148 by means of the bolts 153. As shown in FIG. 6, enclosures 149 may be provided for covering the outer limits of the cover plates 152. Thus, upon reciprocal operation of any of the operator blocks, the slot 159 provided between the plate guide members 150 to permit operation of the operator blocks 143 and 148 is always kept enclosed by the plates 152 and enclosures 149.

Operator slide block 148 has attached to its upper surface the cam follower block 154 at one end of which is mounted for rotation the cam follower in the form of roller 155. Upon operation of the tool contour cam 156, the cam follower roller 155 follows the cam contour 157 causing the operator slide block 148 to move rearwardly and forwardly as indicated by the arrow 158 in FIG. 5. The operator slide block 148 is secured to the piston rod 160 of the spring biasing cylinder 161 which is secured to the base 162 on the cutoff apparatus housing 23. Spring biasing cylinder 162 maintains a biasing force on the operator slide block 148 in order that the cam follower roller 155 is maintained in continuous engagement with the cam contour 157 of the tool contour cam 156.

As shown in FIGS. 2 and 5, the fluid operated rotary motor 170 is connected to drive the gear reducer 171 which in turn drives the output shaft 172 to rotate the tool contour cam 156 as well as the chuck contour cam 173 both of which are secured to output shaft 172. Chuck contour cam 173 is provided with a cam contour 174 which is engaged by the cam follower roller 175 rotatably mounted in the cam follower mounting block 176 secured to the upper end of the operating lever 122. The operating lever 122, like the spring biasing cylinder 162 for operator slide block 148, is provided with a spring biasing cylinder 177 with its piston rod 178 secured at 180 to the operating lever 122. Thus, the operating lever 122 is maintained in biased engagement against the cam contour 174 of the chuck contour cam 173, the contour of which is designed to rotate the lever 122 to bring about reciprocal motion of the chucks 93 and 87 in unison toward and away from one another.

Although not shown, it should be noted that the spring biasing cylinder 162 is provided with a setbolt at its rearward end which is used to adjust the extent of return of the spring biased piston 182 to its normally biased position which would be at the extreme end of the spring biasing cylinder housing. In this connection, it should be realized that the cam contours 157 and 174 of the tool contour cam 156 and the chuck contour cam 173, are designed to permit tool slides 74 and the chucks 93 and 87 to, respectively, move their fullest inward extent toward the center line of the tube 1, and toward one another. Thus, in connection with spring biased cylinder 162, adjustment can be made through operation of its setbolt to selectively limit the inward extent of motion of the tool slides 74. In this manner, adjustment can be made for the extent of tool depth so that proper alignment of the combined cutting and chamfering tool can be accomplished for various tube diameters as well as tube thickness. For example, for tubes of large diameter, the cutting bit 4 should not be permitted to feed inwardly its full possible extent due to operation of the tool slides 74 since the chamfering bit 6 will interfere with the tube ends 12 before the step of separation of the tube ends by means of the support carriages for the chucks 93 and 87 has been carried out. Thus, through adjustment of the setbolt of spring biased cylinder 162, the cam follower roller 155 can be caused to disengage from the cam contour 157 at its lowest point to prevent the cutting tool from feeding inwardly relative to the center line of the tube a distance more than is necessary to complete the cutoff operation. At this point, it can be envisioned that if the double chamfering bit 6 only included external chamfering or beveling bits, this setbolt could be adjusted to permit further depth of or pentration by the cutting tool 4 upon completion of the cutoff operation to permit the external chamfering tool to chamfer the outside edges only of the tube sections 10 without operation of the chuck support carriages.

A seabolt is not used in connection with spring biasing cylinder 177 since the lowest cam point on the cam contour 174 or, for that matter, the closest adjacent position obtainable by the chucks 93 and 87, is usually the normal rest position of the chucks during the cutoff operation. However, that portion of the cam contour 174 responsible for operation of the chucks during the chamfering operation in driving the cut tube ends into the chamfering tool may be provided, variable cam means in the form of a secondary cam surface adjustable depending on the length of travel desired by the chucks 93 and 87. The inward extent of the motion of the chucks 93 and 87 is adjusted in accordance with the desired size of chamfering to be placed on the tube ends 12 which also, of course, will depend upon the wall thickness of the tube upon which the chamfering operation is to be performed.

Although the fluid and electrical operation of the cutoff apparatus 20 does not form a part of this invention, a brief explanation will be given of the sequential operation of the cutoff apparatus in order that a general understanding may be had of the sequential cooperative relationship among the various operative elements of the cutoff apparatus 20.

The cutting tool used will be the combined cutting and chamfering tool 3 designed to perform a cutoff and chamfering operation. Thus, the operator slide blocks 143 are tied together by means of locking plate 145. Machine adjustments are made with respect to tube size and tube wall thickness as generally described previously.

The tube or workpiece proceeds along conveyor 25 into the aligned opening 26 of the cutoff apparatus 20 until its forward end comes in contact with a tube stop, adjusted to stop the tube within the cutoff apparatus at the point of selected clutoff. A limit switch at the tube stop is tripped by tube contact against the stop causing the fluid operation of the cutoff apparatus chucks 93 and 87. The operation of the chucks initiates operation of the tool feed motor 146. Since the operator slide blocks are maintained at a rest position as shown in FIG. 6, the piston of the feed motor 146 is programmed to initially rapidly traverse the feed cylinder to the rearward extent thereof where it then will proceed at a pre-set feed rate, moving the operator slide block 143 from right to left upon viewing FIG. 6 which causes the follower ring member 64 to extend its spider member 37 to operate the tool slide operating levers 46 and thus feed radially inward the tool slides 74 to perform the cutoff operation. Upon completion of cutoff, limit switch 185 is tripped by the piston rod 167 of the feed motor 146, retracting rapidly the piston rod 167 to return the operator slide blocks 143 as well as the feed motor 146 to their normal rest position and, at the same time, also commence the operation of the cam drive motor 170. The sequencing of the tool contour cam 156 and the chuck contour cam 173 for one complete revolution of these cams will effect separation of the cut tube sections 10, radial alignment of the tool slides 74 through operation of the slide block 148 on the cam ring member 66, while the operator slide blocks 143 are held stationary by the feed motor 146, so that the double chamfer bit 6 is properly aligned within the tube edges 12; then drawing together by continued operation of the chuck cam 173 the tube ends 12 toward the double chamfering bit 6 so that the tube ends are prepositioned for engagement by the chamfering bit, and thereafter separating again the tube sections 10 to permit withdraw, by continued operation of the tool cam 156, of the chamfering bit 6 from between the tube sections 10. At this point, it should be noted that the tool cam 156 may be designed to cause reciprocation of the chamfering bit to perform the chamfering operation when the tube ends have been pre-positioned as mentioned. Upon withdraw of the chamfering tool, limit switch 183 is tripped opening chuck 93 while the cam drive motor 170 continues to operate. At this time, the tube section 10 at the left of the tool 3 in FIG. 3, cut to proper length and properly finished at its ends, is permitted to drop from between the chuck jaws 104 to be conveyed away from the cutoff apparatus 20. The cam drive motor 170, continuing to operate, causes the chucks 93 and 87 to move inwardly toward one another to their original starting or rest position. At the completion of one revolution of output cam shaft 172, the limit switch 184 is actuated to stop the cam drive motor 170, thus completing the cutoff and chamfering operation and permitting reoccurrence of the tube length positioning within the opening 26 of the cutoff apparatus and thereafter initiation of the complete cutoff and chamfering operations upon actuation of the limit switch at the tube stop.

From the foregoing description it can be seen that the tool and chuck cams 156 and 173 mechanically function to accurately control the cooperative sequencing between the operations of the chucks 93 and 87 and the tool insertion and withdraw operation brought about by the tool actuating means 55. Without the intercooperative mechanical relationship of the follower cam ring members 64 and 65 relative to the cam ring member 66 wherein either one member is held stationary upon motion imparted to the other member, it would not be possible to provide a combined cutting and chamfer tool capable of being properly aligned and/or fed to perform the cutting and chamfering operations on variable diametrical size and wall thickness size tubular workpieces.

What is claimed is:

1. The method of cutting a tube and thereafter chamfering selected of the tube edges of the adjacent cut tube ends at a single station comprising the steps of gripping the tube adjacent both sides of the selected point of cutoff, cutting the tube at the selected cutoff point, separating the cut tube ends while the same are being firmly gripped, simultaneously chamfering the selected tube edges of the adjacent cut tube ends by inserting in aligned relation therebetween a chamfering tool and thereafter drawing together the separated tube ends toward the chamfering tool to a predetermined position for proper engagement by the chamfering tool.

2. The method of claim 1 characterized by providing at the station a cutting tool and a chamfering tool, cutting the tube with the cutting tool at the selected point of cutoff, separating the tube ends for inserting the chamfering tool between and in aligned relation with the cut edges of both tube ends while the latter are firmly gripped and thereafter drawing together the separated tube ends into the chamfering tool to chamfer the selected tube edges of both cut tube ends.

3. The method of claim 1 characterized by providing at the station a tool having a cutting segment and a chamfering segment, cutting the tube with the cutting segment of the tool at the selected point of cutoff, separating the tube ends for inserting the chamfering segment of the tool between and in aligned relation with the cut edges of both tube ends while the latter are being firmly gripped and thereafter drawing together the separated tube ends into the chamfering tool to chamfer the selected tube edges of both cut tube ends.

4. The method of cutting a tube and thereafter chamfering the internal edges of the adjacent cut tube ends at a single station comprising the steps of gripping the tube adjacent both sides of the selected point of cutoff, cutting the tube at the selected cutoff point, separating the cut tube ends while the same are being firmly gripped, simultaneously chamfering the internal edges of the adjacent cut tube ends by inserting in aligned relation therebetween a chamfering tool and thereafter drawing together the separated tube ends toward the chamfering tool to a predetermined position for engagement by the chamfering tool.

5. The method of cutting a tube and thereafter chamfering selected of the tube edges of the adjacent cut tube ends at a single station comprising the steps of (a) gripping the tube adjacent both sides of the selected point for cutoff, (b) feeding a cutting tool radially inward of the tube to cut the tube at the selected point of cutoff, (c) withdrawing the cutting tool upon completion of cutoff, (d) separating the cut tube ends while the same are being firmly gripped, (e) inserting a chamfering tool between and in aligned relation with the cut edges of both tube ends, (f) drawing together the separated tube ends into the chamfering tool to chamber the selected tube edges of both cut tube ends, (g) separating again the gripped tube ends and (h) thereafter withdrawing the chamfering tool from between the tube ends.

6. The method of claim 5 characterized by providing a chamfering tool capable of chamfering the internal cut edges of both tube ends upon drawing together the separated tube ends into the chamfering tool.

7. The method of claim 5 characterized by providing an operative tool holder for the cutting tool and an operative tool holder for the chamfering tool.

8. The method of claim 5 characterized by providing a tool having a cutting segment and a chamfering segment operative in a single tool holder.

9. The method of cutting a tube and thereafter chamfering simultaneously the internal and external edges of adjacent cut tube ends at a single station, using a tool having a cutting segment and a chamfering segment comprising the steps of gripping the tube adjacent both sides of the selected point of cutoff, cutting the tube with the cutting segment of the tool at the selected point, separating the tube ends for inserting the chamfering segment of the tool between and in aligned relation with the cut edges of both tube ends while the latter are being firmly gripped, and thereafter drawing together the separated tube ends into the chamfering segment of the tool to chamfer simultaneously the internal and external cut edges of both tube ends.

10. The method of sequentially cutting tubes and chamfering the internal and external edges of the cut tube ends while the tube is being held firmly within a cutoff machine comprising the steps of gripping the tube adjacent both sides of the selected point for cutoff, feeding a cutting, chamfering tool radially inward of the tube to cut off the tube at the selected point of cutoff, separating the gripped tube ends, as cut, inserting the tool between the separated tube ends to align the chamfering segment of the tool with the cut edges of the tube ends and thereafter drawing together the gripped tube ends into the tool segment to chamfer simultaneously the internal and external cut edges of both tube ends.

11. The method of sequentially cutting tubes and chamfering the internal and external edges of the cut tube ends while the tube is being held firmly within a cutoff machine comprising the steps of (a) gripping the tube adjacent both sides of the selected point for cutoff, (b) feeding a cutting, chamfering tool radially inward of the tube to cut the tube at the selected point of cutoff, (c) withdrawing the tool upon completion of cutoff, (d) separating the gripped tube ends, as cut, (e) inserting the tool between the separated tube ends to align the chamfering segment of the tool with the cut edges of the separated tube ends, (f) drawing together the gripped tube ends into the tool to chamfer simultaneously the internal and external cut edges of both tube ends, (g) separating again the gripped tube ends, as chamfered, and (h) thereafter withdrawing the tool from between the tube ends.

12. The method of cutting a tube and thereafter finishing selected of the tube edges of the adjacent cut tube ends at a single station comprising the steps of gripping the tube adjacent both sides of the selected point of cutoff, cutting the tube at the selected cutoff point, separating the cut tube ends while the same are being firmly gripped, simultaneously finishing the selected tube edges of the adjacent cut tube ends by inserting in aligned relation therebetween a finishing tool and thereafter drawing together the separated tube ends toward the finishing tool to a predetermined position for proper engagement of the finishing tool.

13. The method of cutting a tube and thereafter finishing selected of the tube edges of the adjacent cut tube ends at a single station, using a tool having a cutting segment and a finishing segment comprising the steps of gripping the tube adjacent both sides of the selected point of cutoff, feeding the tool radially inward of the tube to cut with the cutting segment of the tool the tube at the selected cutoff point, feeding further the tool radially inward between the adjacent cut tube ends to align the finishing segment of the tool between the cut tube ends, and thereafter drawing together the cut tube ends toward the finishing segment of the tool to a predetermined position for proper engagement by the finishing segment of the tool.

14. The method of cutting a tube and thereafter finishing selected of the tube edges of the adjacent cut tube ends at a single station using a cutoff machine having a plurality of tool holders, at least one of which carries a cutoff tool and at least one other of which carries a finishing tool comprising the steps of gripping the tube adjacent both sides of the selected point of cutoff, feeding radially inward of the tube and thereafter withdrawing the cutting tool to cut the tube at the selected cutoff point, feeding radially inward of the tube the finishing tool and aligning said tool between the cut tube ends for finishing selected of the cut edges of both tube ends and thereafter drawing together the cut tube ends toward the finishing tool to a predetermined position for proper engagement by the finishing tool.

15. The method of claim 14 including the step of separating the cut tube ends while the same are being firmly gripped prior to feeding and aligning of the finishing tools between the cut tube ends.

16. The method of cutting a tube and thereafter finishing selected of the tube edges of the adjacent cut tube ends at a single station using a cutoff machine having two pairs of two oppositely disposed tool holders, one pair for carrying cutoff tools and the other pair for carrying finishing tools comprising the steps of gripping the tube adjacent both sides of the selected point of cutoff, feeding and thereafter withdrawing the one pair of cutting tools radially inward of the tube to cut the tube at the selected cutoff point, feeding inwardly the other pair of finishing tools and aligning said tools between the cut tube ends for finishing selected of the cut edges of both tube ends and thereafter drawing together the cut tube ends toward the finishing tools to a predetermined position for proper engagement by the finishing tools.

References Cited

UNITED STATES PATENTS

| 2,030,562 | 2/1936 | Barnes et al. | 82—20 |
| 2,262,178 | 11/1941 | Gest et al. | 82—20 |
| 2,616,325 | 11/1952 | Abbey | 82—20 |
| 2,377,384 | 6/1945 | Slovak | 82—47 |
| 3,131,588 | 5/1964 | McConnell | 82—47 |
| 3,171,308 | 2/1965 | Marti | 82—2 |

HARRISON L. HINSON, Primary Examiner

U.S. Cl. X.R.

82—2, 46, 47